(12) United States Patent
Bunel et al.

(10) Patent No.: US 9,599,344 B2
(45) Date of Patent: Mar. 21, 2017

(54) COMBUSTION CHAMBER FOR A TURBINE ENGINE

(71) Applicant: SNECMA, Paris (FR)

(72) Inventors: Jacques Marcel Arthur Bunel, Thiais (FR); Gilles Ulryck, Ballancourt sur Essonne (FR)

(73) Assignee: SNECMA, Paris (FR)

( * ) Notice: Subject to any disclaimer, the term of this patent is extended or adjusted under 35 U.S.C. 154(b) by 611 days.

(21) Appl. No.: 14/070,698

(22) Filed: Nov. 4, 2013

(65) Prior Publication Data

US 2014/0318138 A1  Oct. 30, 2014

(30) Foreign Application Priority Data

Nov. 9, 2012  (FR) ...................................... 12 60644

(51) Int. Cl.
| | | |
|---|---|---|
| *F23R 3/60* | (2006.01) | |
| *F23R 3/28* | (2006.01) | |
| *F23R 3/00* | (2006.01) | |

(52) U.S. Cl.
CPC ............... *F23R 3/60* (2013.01); *F23R 3/002* (2013.01); *F23R 3/283* (2013.01); *F23R 2900/03044* (2013.01); *Y02T 50/675* (2013.01)

(58) Field of Classification Search
CPC .. F23R 3/002; F23R 3/60; F23R 3/283; F23R 3/10; F23R 3/44; Y02T 50/675
See application file for complete search history.

(56) References Cited

U.S. PATENT DOCUMENTS

| | | | | |
|---|---|---|---|---|
| 5,509,270 | A | * 4/1996 | Pearce | ...................... F23R 3/10 60/740 |
| 5,765,376 | A | 6/1998 | Zarzalis et al. | |
| 5,941,076 | A | * 8/1999 | Sandelis | ................ F23R 3/002 60/752 |
| 6,497,105 | B1 | * 12/2002 | Stastny | ................... F23R 3/283 29/890.01 |

(Continued)

FOREIGN PATENT DOCUMENTS

| | | |
|---|---|---|
| EP | 2 256 413 A1 | 12/2010 |
| FR | 2 935 465 | 3/2010 |
| FR | 2 943 404 | 9/2010 |

OTHER PUBLICATIONS

French Preliminary Search Report issued in French Application 12 60644, filed on Nov. 9, 2012 ( with written opinion and English Translation of Categories of Cited Documents).

*Primary Examiner* — Craig Kim
(74) *Attorney, Agent, or Firm* — Oblon, McClelland, Maier & Neustadt, L.L.P.

(57) ABSTRACT

A combustion chamber (110) for a turbine engine, such as an airplane turboprop or turbojet, the combustion chamber comprising two coaxial annular walls, respectively an inner wall and an outer wall, that are connected together at their upstream ends by a chamber end wall (118) having an annular row of openings (119) for mounting fuel injection devices (120), the combustion chamber being characterized in that an annular metal sheet (130) is mounted upstream from the end wall and includes mounting orifices for receiving the above-mentioned injection devices, the sheet being substantially parallel to the end wall and co-operating therewith to define an annular air flow cavity (140).

8 Claims, 4 Drawing Sheets

(56) References Cited

U.S. PATENT DOCUMENTS

| | | | |
|---|---|---|---|
| 6,546,733 B2* | 4/2003 | North | F23R 3/002 60/740 |
| 6,923,002 B2* | 8/2005 | Crawley | F23R 3/283 29/890.02 |
| 7,849,696 B2 | 12/2010 | De Sousa et al. | |
| 8,037,691 B2* | 10/2011 | Commaret | F23R 3/002 60/737 |
| 8,387,395 B2 | 3/2013 | Commaret et al. | |
| 8,490,401 B2* | 7/2013 | Commaret | F23R 3/283 60/742 |
| 2004/0083735 A1* | 5/2004 | Borns | F23R 3/10 60/772 |
| 2006/0242939 A1* | 11/2006 | Pieussergues | F23R 3/50 60/39.35 |
| 2008/0016874 A1* | 1/2008 | Markarian | F23R 3/002 60/772 |
| 2008/0066468 A1* | 3/2008 | Faulder | F23R 3/002 60/737 |
| 2009/0188255 A1 | 7/2009 | Green et al. | |
| 2013/0333387 A1 | 12/2013 | Leblond et al. | |

* cited by examiner

COMBUSTION CHAMBER FOR A TURBINE ENGINE

The present invention relates to a combustion chamber for a turbine engine, such as an airplane turboprop or turbojet.

A combustion chamber of this type conventionally comprises two coaxial annular walls, respectively an inner wall and an outer wall, that are connected together at their upstream ends by a chamber end wall. The end wall is substantially radial and it is fastened via its inner and outer peripheries to the upstream ends of the inner and outer walls respectively of the chamber. The end wall has an annular row of openings for mounting fuel injection devices.

In the prior art, the end wall is thermally protected by a ring of deflectors, which deflectors are mounted in the chamber, directly downstream from the end wall, thereby protecting the end wall from the radiation of the flame that is generated in the chamber. Each deflector has an orientation that is circumferential, and the detectors are arranged circumferentially beside one another, being spaced apart circumferentially from one another. The end wall as multiple perforations for passing cooling air, this air serving to impact against the deflectors in order to cool them in operation, and then to flow axially between the outer periphery of the ring of deflectors and the outer wall, and between the inner periphery of the ring and the inner wall. The deflectors are fastened to the end wall by brazing.

Nevertheless, that technology presents numerous drawbacks. The circumferential clearance is between the deflectors give rise to leaks of cooling air, thereby generating problems of pollution, of fuel consumption, and of reigniting the combustion chamber in the event of flameout. Furthermore, the deflectors are very expensive to make and they are relatively heavy. Furthermore, adding a "failsafe" type safety system to the chamber for the purpose of holding the deflectors in the event of the fastening coming undone, further increases the overall weight of the combustion chamber.

A particular object of the invention is to provide a solution that is simple, effective, and inexpensive to this problem.

To this end, the invention provides a combustion chamber for a turbine engine, such as an airplane turboprop or turbojet, the combustion chamber comprising two coaxial annular walls, respectively an inner wall and an outer wall, that are connected together at their upstream ends by a chamber end wall having an annular row of openings for mounting fuel injection devices, the combustion chamber being characterized in that an annular metal sheet is mounted upstream from the end wall and includes mounting orifices for receiving the above-mentioned injection devices, the sheet being substantially parallel to the end wall and co-operating therewith to define an annular air flow cavity.

The present invention is particularly advantageous since it makes it possible to eliminate the prior art deflectors, which are heavy, expensive, and present numerous problems. Since the chamber need not have any deflectors, it can define an internal combustion cavity of greater length. This chamber no longer needs to have the "failsafe" system of the prior art. In the invention, the end wall is exposed directly to the radiation from the flame and it is cooled in operation by air flowing in the above-mentioned cavity. The downstream face of the end wall may be coated in a thermal barrier for increasing the ability of the end wall to withstand high temperatures. By way of example, the metal sheet fitted upstream to the end wall has a thickness lying in the range 0.5 millimeters (mm) to 2 mm, and preferably in the range 0.6 mm to 1.2 mm, approximately. The metal sheet may be made of a material similar to that used for the end wall, and by way of example it may be made of an alloy based on nickel or cobalt, such as hastelloy X or HA188.

The sheet may have an inner annular rim and an outer annular rim bearing radially respectively against an inner annular rim and an outer annular rim of the end wall. The sheet may be mounted with radial prestress between the inner and outer rims of the end wall. This makes it possible to guarantee sealing between the sheet and the end wall. Furthermore, this technique for mounting on the chamber end wall is very easy, and it does not involve parts that are bulky and that increase the overall weight of the engine.

According to another characteristic of the invention, the sheet includes multiple perforations for feeding the cavity with air. The air that passes through these multiple perforations impacts against the end wall in order to cool it.

The end wall may include at least one annular row of air outlet slots, each slot extending circumferentially around the longitudinal axis of the chamber.

The air contained in the cavity is exhausted into the chamber through the slots. Preferably, the end wall has both an outer annular row of slots that extends outside the openings for mounting injection devices in the end wall in order to form a film of air that replaces the film of air flowing between the outer peripheries of the deflectors and the outer wall of the chamber in the prior art, and also an inner annular row of slots situated at the inner periphery of the end wall to form a film of air that replaces the film of air flowing between the deflectors and the inner wall of the chamber in the prior art.

A substantially cylindrical ring is engaged in each opening in the end wall, the ring having an outer annular collar with a downstream side face for bearing against the end wall and an upstream side face and for bearing against the sheet or against another ring on the same axis and bearing against the sheet.

The collar of the ring is thus interposed between the sheet and the end wall, and it defines the thickness of the airflow cavity. The ring may be fastened to the end wall by brazing or welding.

A sheath may be mounted in the ring and includes an outer annular rim defining a downstream annular surface for bearing against the sheet. In the assembled position, in which the rim of the sheath bears against the sheet, the ring is separated from the sheath by axial clearance. This assembly serves to prevent the sheet from moving by clamping it between the sheath and the ring. The sheath may be fastened to the ring by brazing or by welding.

The combustion chamber of the invention may be fitted with twenty fuel injection devices, in which case the sheet has twenty orifices for mounting the injection devices.

The present invention also provides a turbine engine such as an airplane turboprop or turbojet, characterized in that it includes a combustion chamber as described above.

The invention can be better understood and other details, characteristics, and advantages of the invention appear on reading the following description made by way of non-limiting example and with reference to the accompanying drawings, in which.

Figure 1:
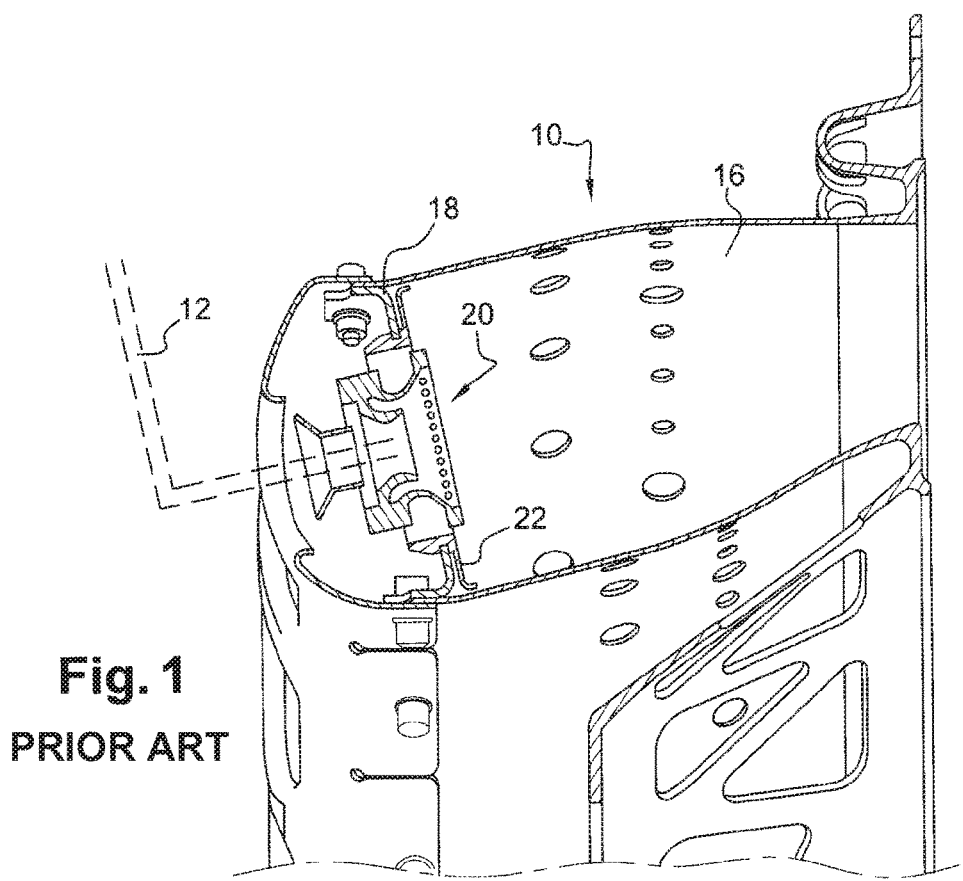
FIG. 1 is a diagrammatic half-view in axial section of a combustion chamber of a prior art turbine engine.
Figure 2:
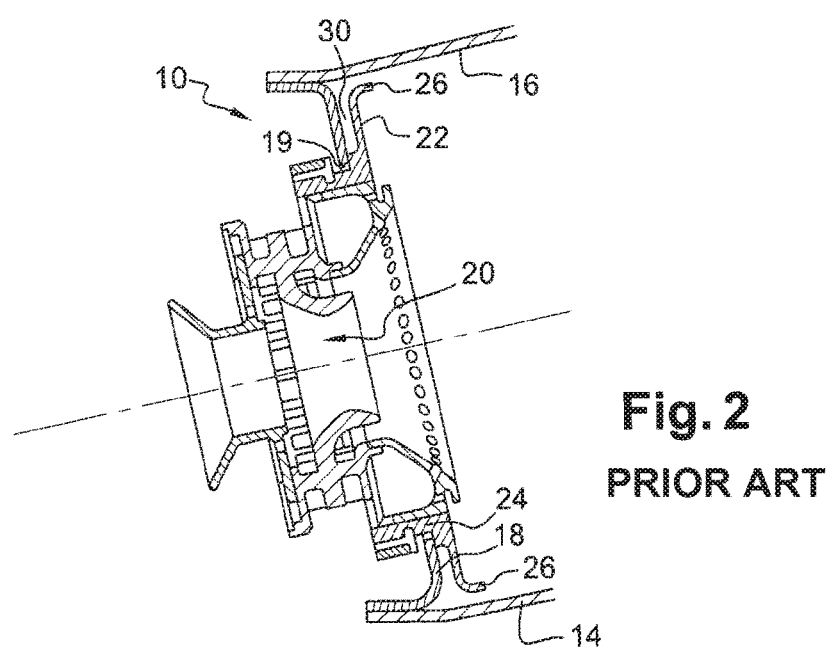
FIG. 2 is a diagrammatic view on a larger scale of a portion of FIG. 1.
Figure 3:
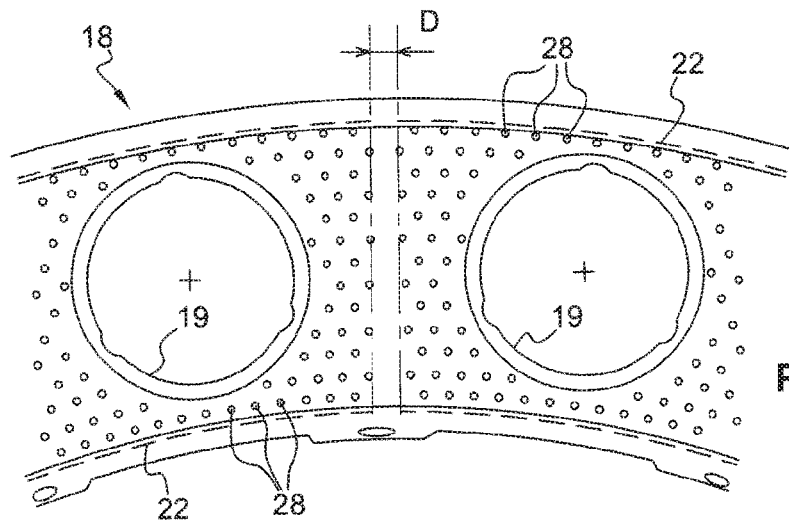
FIG. 3 is a fragmentary diagrammatic view in perspective of the end wall of the FIG. 1 chamber seen from downstream.

FIGS. 1 to 3 show a combustion chamber 10 of a turbine engine in accordance with the prior art. The engine includes a compressor (not shown) in which air is compressed prior to being injected via an annular diffusion duct into a chamber casing (not shown), and then into the combustion chamber 10 mounted inside the casing. The compressed air penetrates into the combustion chamber 10 and mixes with fuel coming from injectors 12.

The gas obtained by combustion is directed towards a high-pressure turbine (not shown) situated downstream from the outlet of the chamber 10.

The combustion chamber 10, which is of the annular type, has a radially inner wall 14 and a radially outer wall 16 that are coaxial, with the upstream ends thereof being connected together by an end wall 18 that extends substantially radially.

The end wall 18 has a plurality of openings 19 for mounting fuel injection devices 20, in which fuel injector heads 12 are to be engaged.

The combustion chamber 10 also has deflectors 22 mounted downstream from the end wall 18 for the purpose of protecting it from the flame that is formed in the combustion chamber 10.

Each deflector 22 is generally in the shape of an annular sector and it is secured to a cylindrical sheath 24 of an injection device 20, the sheath being engaged in and brazed to one of the openings 19 of the end wall, as can be seen more clearly in FIG. 2.

Each deflector 22 has an inner peripheral edge and an outer peripheral edge, which edges are connected together by radial side edges, as shown diagrammatically by chain-dotted lines in FIG. 3. The deflectors 22 are arranged to be adjacent to one another via their radial edges, so as to form an annular ring of deflectors 22 protecting the end wall 18. In the assembled position, the deflectors 22 are spaced apart from one another by circumferential clearances D that give rise to the numerous problems described above.

The inner and outer peripheral edges of the deflectors have respective rims 26 extending downstream parallel to the inner and outer walls 14 and 16, and spaced apart therefrom by a predetermined distance.

The end wall 18 has multiple perforations 28 (FIG. 3) serving to pass air coming from the compressor and leading into the annular space 30 that is arranged between the end wall 18 and the deflectors 20 (FIG. 2).

The jets of air coming from these multiple perforations 28 impact against the deflectors 20 so as to cool them. Furthermore, the films of air passing between the rims 26 and the inner and outer walls 14, 16 serve to cool those walls.

As can be seen in FIG. 3, the end wall 18 does not have multiple perforations 28 in the above-mentioned clearances D, and it is not ventilated in those zones. The ventilation of the end wall 18 is therefore not uniform over its entire circumference.

The invention serves to remedy the above-mentioned problems of the prior art, at least in part, by means of an annular metal sheet that is placed on and fastened to the upstream side of the end wall of the combustion chamber and that serves to eliminate the prior art deflectors and thus likewise their drawbacks.

Figure 4:
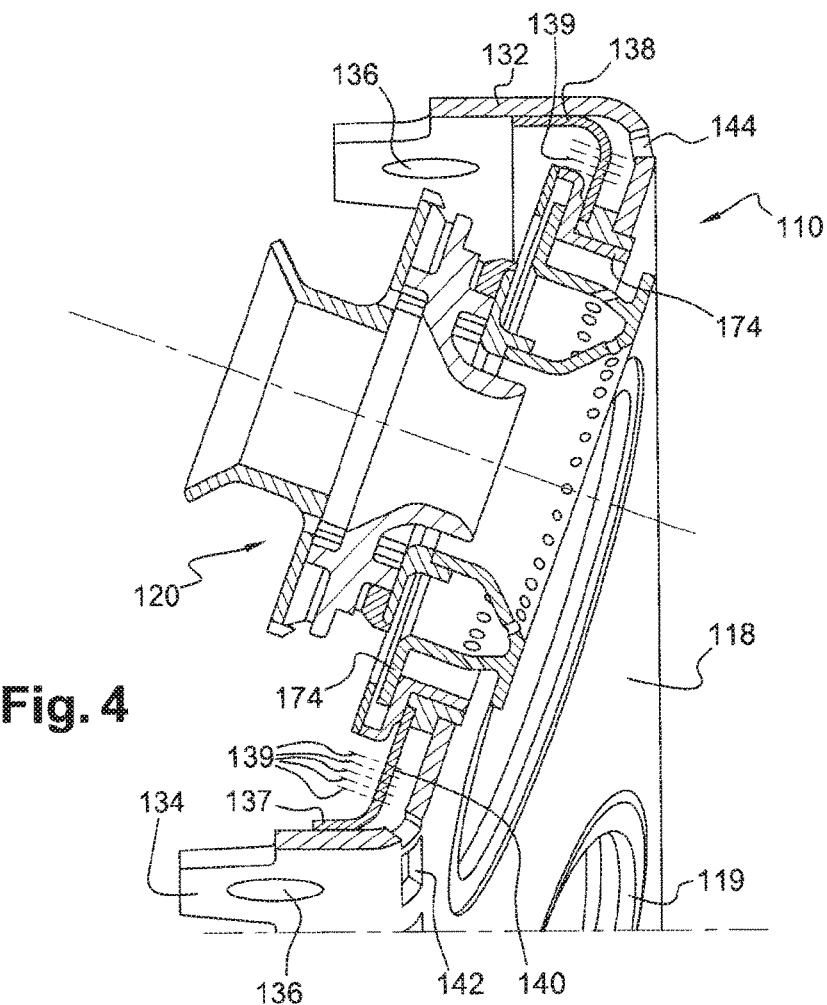
FIG. 4 is a view corresponding to FIG. 2 and showing an embodiment of the invention.
Figure 5:
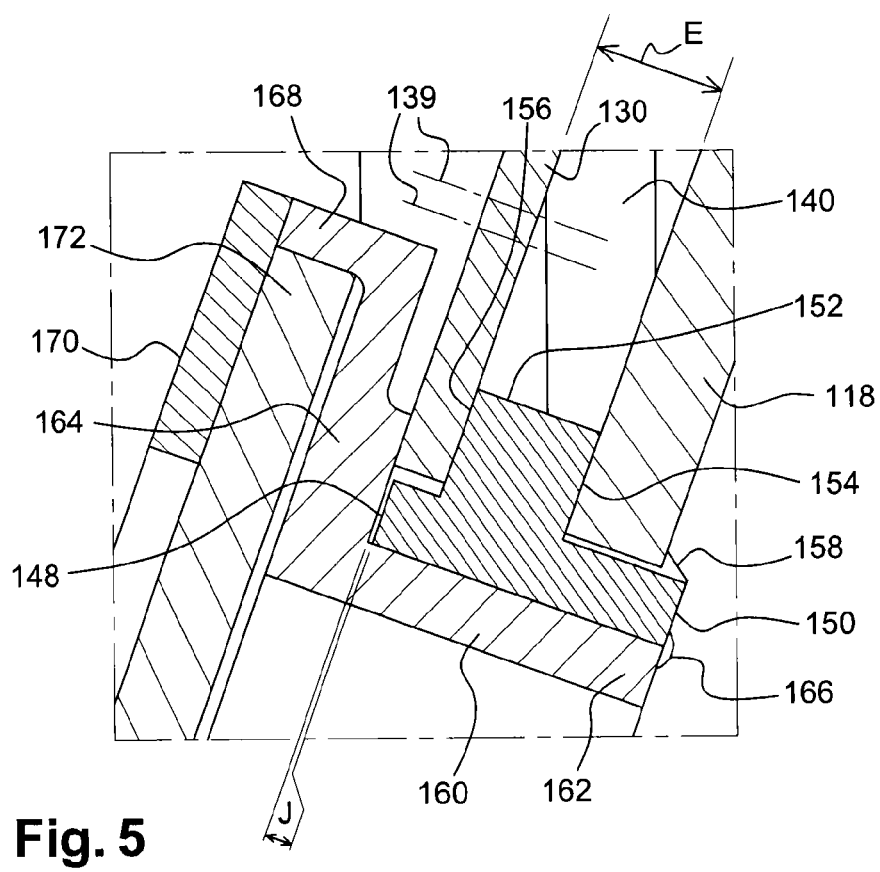
FIG. 5 is a diagrammatic view on a larger scale of a portion of FIG. 4.
Figure 6:
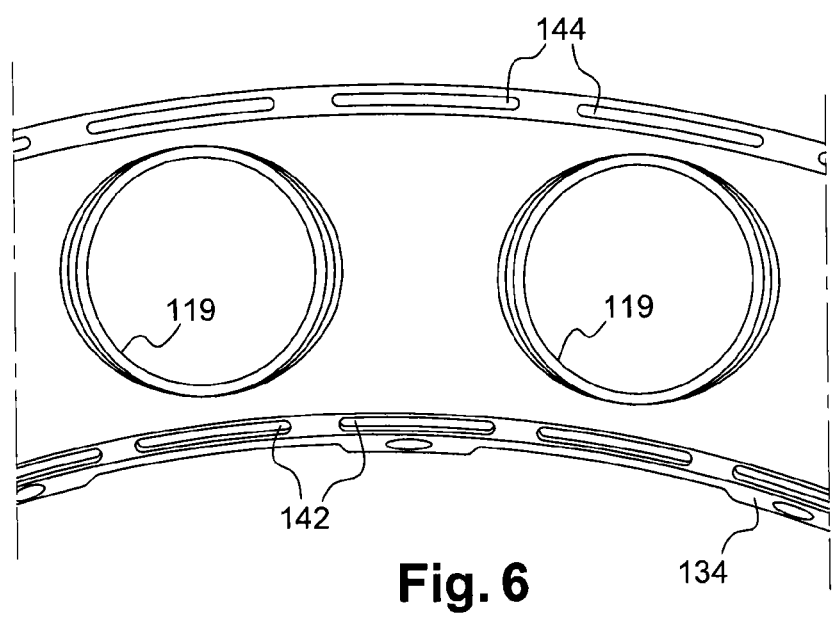
FIG. 6 is a fragmentary diagrammatic view in perspective of the end wall of the FIG. 4 chamber seen from downstream.

FIGS. 4 to 6 show an embodiment of the present invention.

The combustion chamber 110 of FIGS. 4 to 6 differs from the above-described combustion chamber in particular in that it does not have deflectors and instead that it has an annular metal sheet 130 that is mounted upstream from the end wall 118, parallel to the end wall and spaced apart therefrom.

The end wall 118 differs from the end wall described above in that it does not have multiple perforations (FIG. 6). It has an annular row of openings 119 in which the injection devices 120 are mounted, as described in greater detail below. The end wall has a substantially cylindrical upstream annular rim 132 at its outer periphery for fastening to the upstream end of the outer wall of the chamber, and it has a substantially cylindrical upstream annular rim 134 at its inner periphery for fastening to the upstream end of the inner wall of the chamber. These walls are fastened by nut-and-bolt type means that pass through radial orifices 136 in the walls.

The metal sheet 130 and has a substantially cylindrical upstream annular rim 137, 138 at each of its inner and outer peripheries. As can be seen in FIG. 4, the outer rim 138 of the sheet 130 bears radially against an inner cylindrical surface of the rim 132 of the end wall 118, and its inner rim 137 bears radially against an outer cylindrical surface of the rim 134 of the end wall. The sheet 130 is preferably radially prestressed between the rims 132, 134 of the end wall in order to provide sealing between these elements at their inner and outer peripheries.

The sheet 130 and the end wall 118 define between them an annular cavity 140 for passing air. The sheet 130 has multiple perforations 139 for passing air that is to impact against the end wall 118 in order to cool it and that is to feed air to the cavity 140 that extends between the sheet 130 and the end wall.

As can be seen in FIG. 6, the end wall 118 has an inner annular row of slots 142 and an outer annular row of slots 144 for exhausting the air contained in the cavity 140. The outer row of slots 144 extends radially outside the openings 119, at the outer periphery of the end wall 118. The slots 144 are for providing a film of air along the outer wall of the chamber. The inner row of slots 142 extends radially inside the openings 119, at the inner periphery of the end wall 118. The slots 144 are to provide a film of air along the inner wall of the chamber.

The sheet 130 has an annular row of orifices 148 that are in alignment with the openings 119 in the end wall 118 and that serve for mounting injection devices 120.

As can be better seen in FIG. 5, a ring 150 is engaged from upstream in each opening 119 in the end wall 118, this ring 150 has an outer annular collar 152 with a downstream annular face 154 that bears against the peripheral edge of the opening 119 in the end wall (on its upstream side), and an upstream annular face 156 against which the peripheral edge of an orifice 148 in the sheet comes to bear (on its downstream side). The thickness or axial size E of the cavity 140 is defined by the thickness or axial size of a collar 152 of the ring.

The ring 150 may be fastened to the end wall 118 by brazing or welding, e.g. via its downstream end (zone 158).

A sheath 160 is mounted coaxially inside the ring 150. This sheath 160 has a downstream cylindrical portion 162 engaged in the ring and it is connected at its upstream end to an outer annular rim 164 having a downstream side surface that is to bear against the peripheral edge of the orifice 148 in the sheet (on its upstream side).

In the assembled position as shown in FIG. 5, the annular rim 164 of the sheath 160 is separated from the ring 150 by clearance J so as to clamp the sheet 130 axially between the sheath and the ring. In this example, this clearance is created by the fact that the cylindrical portion 162 of the sheath is longer than the length of the ring, and that in the assembled position, the downstream ends of the sheath and of the ring are in alignment in a common plane that is radial relative to the longitudinal axis of the ring and of the sheath.

The sheath 160 may be fastened to the ring 150 by brazing or by welding, e.g. via its downstream end (zone 166).

The outer rim 164 of the sheath 160 is connected at its outer periphery to a cylindrical the rim 168 that is directed upstream and against which a washer 170 is to be placed and fastened. This washer 170 and the rim 164 of the sheath define an annular space 172 that receives an outer annular rim 174 of an injection device 120, the rim being free to slide radially so as to compensate for differential thermal expansion in operation.

As can be seen from the above description, the sheet 130 is mounted upstream from the end wall 118 after the rings 150 have been engaged in and fastened to the openings 119 in the end wall 118. Once the sheet 130 is mounted with prestress between the rims 132, 134 of the end wall, and once it bears against the outer collars 152 of the rings 150, the sheaths 160 are engaged in the rings until they bear against the sheet. The sheaths 160 are then fastened to the ring, as explained above. The sheet 130 is then pinched between the sheaths 160 and the rings 150. The injection devices 120 are engaged in the sheaths 160 and their outer rims 174 are received in the above-mentioned spaces 172, these spaces subsequently being closed upstream by the washers 170, which washers are placed on and fastened to the sheaths.

Figure 7:
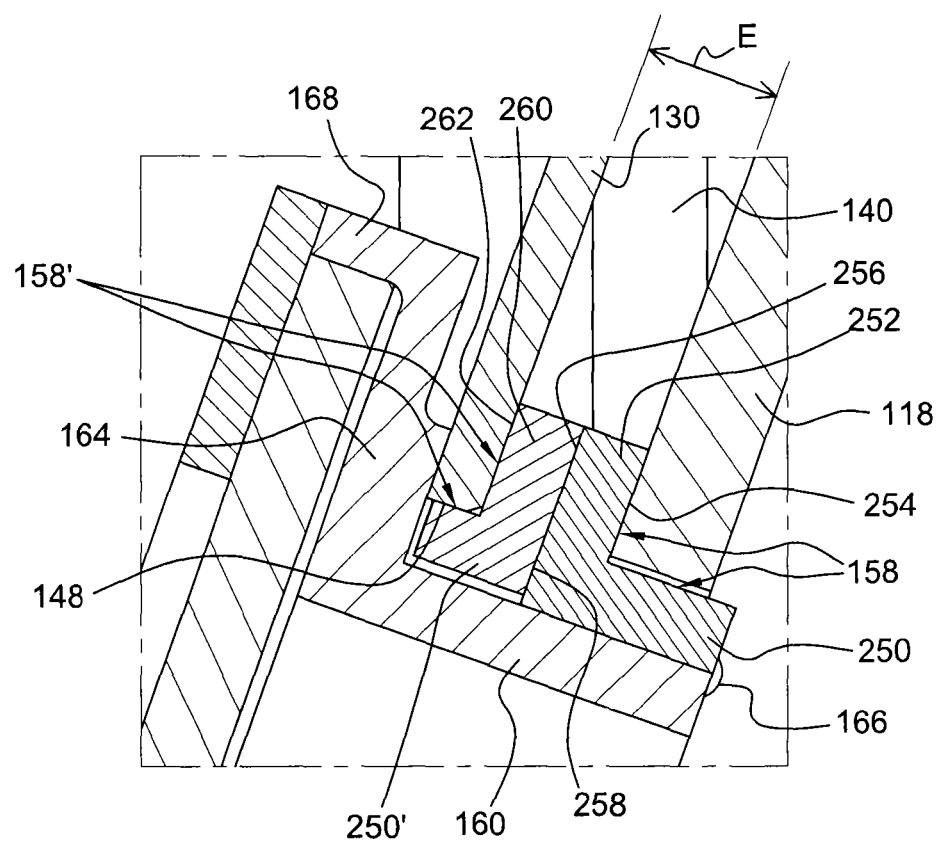
FIG. 7 is a view similar to the view of FIG. 5, and it shows a variant embodiment of the invention.

FIG. 7 shows a variant embodiment of the invention, in which the above-mentioned ring 150 is replaced by two coaxial rings 250, 250'. A first ring 250 is engaged from upstream in each opening in the end wall 118, this first ring 250 having an outer annular collar 252 with a downstream annular face 254 bearing against the peripheral edge of the opening in the end wall (on its upstream side), and an upstream annular face 256 bearing against a downstream annular face 258 of an outer annular collar 260 of the second ring 250'. This second ring 250' is engaged from downstream in an orifice 148 in the sheet 130, and the upstream annular face 262 of its collar 260 bears against the peripheral edge of this orifice 148 (on its downstream side). The thickness or axial size E of the cavity 140 is defined by the combined thicknesses or axial sizes of the collars 252, 260 and of the rings 250, 250'.

The first ring 250 may be fastened to the end wall 118 by brazing, e.g. via the zones 158, and the second ring 250' may be fastened to the sheet 130 by brazing, e.g. via the zones 158'.

The sheath 160 is mounted in the rings 250, 250', coaxially therewith, its outer annular rim 164 serving to bear against the peripheral edge of the orifice 148 in the sheet 130 (on its upstream side) in order to clamp the sheet 130 axially between the sheath and the ring 250'.

The sheath 160 may be fastened to the ring 250 by brazing or by welding, e.g. via its downstream end (zone 166).

In the example shown, the sheath 160 is centered in the opening in the end wall 118 by the first ring 250, and it is spaced apart from the second ring 250' by clearance that is radial (relative to the longitudinal axis of the sheath).

Before the operation of mounting the sheet 130, the rings 250, 250' are mounted respectively in the opening in the end wall 118 and in the orifices in the sheet. The sheet is moved from upstream to downstream in translation along the axis of the engine until the downstream faces 258 of the rings 250' carried by the sheet come to bear against the upstream faces 256 of the rings 250 carried by the end wall. These faces 256, 258 may slope at an angle of about 20° relative to a plane perpendicular to the axis of the engine.

The invention claimed is:

1. A combustion chamber for a turbine engine, the combustion chamber comprising two coaxial annular walls, respectively an inner wall and an outer wall, that are connected together at their upstream ends by a chamber end wall having an annular row of openings for mounting fuel injection devices, the combustion chamber further comprising an annular metal sheet having an upstream portion positioned upstream from the end wall and including mounting orifices for receiving the fuel injection devices, the upstream portion of the annular metal sheet being substantially parallel to the end wall, wherein said upstream portion and said end wall together define an annular air flow cavity, wherein said annular metal sheet also having an inner annular rim and an outer annular rim that bear radially respectively against an inner annular rim and against an outer annular rim of the end wall, said sheet being mounted with radial prestress between the inner annular rim and outer annular rim of the end wall.

2. A combustion chamber according to claim 1, wherein the annular metal sheet includes multiple perforations for feeding the annular air flow cavity with air.

3. A combustion chamber according to claim 1, wherein the end wall includes at least one annular row of air outlet slots, each slot extending circumferentially around the longitudinal axis of the chamber.

4. A combustion chamber according to claim 1, wherein a substantially cylindrical ring is engaged in each opening in the end wall, the substantially cylindrical ring having an outer annular collar with a downstream side face for bearing against the end wall and an upstream side face and for bearing against the annular metal sheet or against another ring on the same axis and bearing against the sheet.

5. A combustion chamber according to claim 4, wherein a sheath is mounted in the substantially cylindrical ring and includes an outer annular rim defining a downstream annular surface for bearing against the annular metal sheet.

6. A combustion chamber according to claim 5, wherein in the assembled position, in which the rim of the sheath bears against the annular metal sheet, the substantially cylindrical ring is separated from the sheath by axial clearance.

7. A combustion chamber according to claim 5, wherein the sheath is fastened to the substantially cylindrical ring, and the substantially cylindrical ring is fastened to the end wall.

8. A turbine engine, comprising a combustion chamber according to claim 1.

* * * * *